United States Patent [19]
Okamoto

[11] Patent Number: 5,548,659
[45] Date of Patent: Aug. 20, 1996

[54] METHOD AND APPARATUS FOR DETECTING CHANGES IN DYNAMIC IMAGES

[75] Inventor: Yasukazu Okamoto, Chiba-ken, Japan

[73] Assignee: Kabushiki Kaisha Toshiba, Kawasaki, Japan

[21] Appl. No.: 312,049

[22] Filed: Sep. 23, 1994

Related U.S. Application Data

[63] Continuation of Ser. No. 997,556, Dec. 28, 1992, abandoned.

[30] Foreign Application Priority Data

Dec. 27, 1991 [JP] Japan .................................. 3-345813

[51] Int. Cl.6 ......................................................... G06K 9/00
[52] U.S. Cl. ............................................. 382/107; 348/155
[58] Field of Search ...................................... 382/130, 275, 382/294, 276, 107, 254; 348/154, 155, 700

[56] References Cited

U.S. PATENT DOCUMENTS

| | | | |
|---|---|---|---|
| 3,823,261 | 7/1974 | Bolsey | 382/54 |
| 4,437,161 | 3/1984 | Anderson | 382/130 |
| 4,703,358 | 10/1987 | Flannaghan | 348/700 |
| 4,903,205 | 2/1990 | Hishinuma | 382/130 |
| 4,937,878 | 6/1990 | Lo et al. | 382/1 |
| 5,034,986 | 7/1991 | Karmann et al. | 382/41 |
| 5,048,110 | 9/1991 | Nakajima | 382/130 |
| 5,067,014 | 11/1991 | Bergen et al. | 358/105 |
| 5,150,426 | 9/1992 | Banh et al. | 358/105 |
| 5,151,945 | 9/1992 | Lee et al. | 358/105 |
| 5,179,441 | 1/1993 | Anderson et al. | 358/88 |
| 5,233,417 | 8/1993 | Nouso | 358/105 |

OTHER PUBLICATIONS

"Robust Object Detection under Various Environmental Conditions", Maeda et al., NTT Human Interface Laboratories, Japan, pp. 1–16, 3pps. of figures.

Primary Examiner—Joseph Mancuso
Assistant Examiner—Gerard Del Rosso
Attorney, Agent, or Firm—Foley & Lardner

[57] ABSTRACT

A method and apparatus for detecting changes in dynamic images. The method and apparatus are capable of detecting movement at a high precision of a moving object against a static background, regardless of the variation of the image taking environmental condition, such as a lighting condition. In the apparatus, input images of a moving object are taken against a static background sequentially, and difference images are obtained from successive ones of the input images. Then, an appropriate noise model for a lightness variation due to an image taking environmental condition under which the input images are taken is estimated according to the input images and the difference images. Changed regions in an entire imaging view field are detected according to the input images, the difference images, and the appropriate noise model.

16 Claims, 3 Drawing Sheets

METHOD AND APPARATUS FOR DETECTING CHANGES IN DYNAMIC IMAGES

This application is a continuation of application Ser. No. 07/997,556, filed Dec. 28, 1992, now abandoned.

BACKGROUND OF THE INVENTION

1. Field of the Invention

The present invention relates to a method and an apparatus for detecting changed regions within dynamic images by using a prescribed noise model.

2. Description of the Background Art

In general, for processing dynamic images, a method using difference images is widely used. Here, the difference image is obtained by taking a difference in each picture element between images taken at sequential timings separated by a certain time interval dt.

In this method using difference images, it is possible to detect a movement of a target moving object by obtaining the successive difference images for images of the moving target, and utilizing the fact that the differences in the picture elements become large only in immediately the surrounding regions of the target moving object in a case the target moving object moved. One assumes that only the target moving object can move, while the background remains static and the imaging device is fixed. The actual detection of movement of the target moving object can be accomplished by applying various image processing operations such as binarization and labelling to the difference images.

Now, this conventional method for detecting a movement of a target moving object by using difference images is based on an assumption that the image of the background remains static throughout the entire operation. However, in reality, the image of the background is constantly fluctuating in accordance with a lighting condition, even for the completely motionless background. Namely, the background image is affected by the flickering of the fluorescent lamp usually employed at an indoor image taking site. Normally, the fluorescent lamp flickers at a frequency of the electric power source frequency such as 50 Hz or 60 Hz. The background images, thus can have lightness variations depending on the image taking timings.

For this reason, the picture element values in the difference image may not necessarily be small enough to be negligible for the background regions, and therefore it is necessary to separate the target moving object from the background regions by using an appropriate binarization threshold.

As a consequence, in order for movement of the target moving object to be detectable, it is necessary for the target moving object to have a certain level of contrast with respect to the background, so that it has practically been difficult to detect a movement of target moving object which is semi-transparent and has very little contrast, such as steam.

Conventionally, this problem has been resolved by employing an inverter circuit in a lighting equipment such that the flickering frequency of the fluorescent lamp is increased in order to reduce the influence of the flickering. However, it can be quite expensive to make such a modification to all the fluorescent lamps located within an entire view field to be imaged by the imaging device.

Moreover, controlling the image taking timings in synchronization with the appropriately sensed flickering frequency of the lighting equipment, it becomes impossible to take the images at a rate faster than the flickering frequency of the lighting equipment.

SUMMARY OF THE INVENTION

It is therefore an object of the present invention to provide a method and an apparatus for detecting changes in dynamic images capable of detecting a movement of a target moving object at high precision regardless of the variation of any image taking environmental condition, such as lighting condition.

According to one aspect of the present invention, there is provided an apparatus for detecting changes in dynamic images, comprising: image input means for taking input images of a moving object against a static background sequentially; difference calculation means for obtaining difference images from successive ones of the input images taken by image input means; noise model estimation means for estimating an appropriate noise model for a lightness variation due to an image taking environmental condition under which the input images are taken by the image input means, according to the input images taken by the image input means and the difference images obtained by the difference calculation means; and change detection means for detecting changed regions in an entire imaging view field according to the input images taken by the image input means, the difference images obtained by the difference calculation means, and the appropriate noise model estimated by the noise model estimation means.

According to another aspect of the present invention there is provided a method for detecting changes in dynamic images, comprising the steps of: (a) taking input images of a moving object against a static background sequentially; (b) obtaining difference images from successive ones of the input images taken at the step (a); (c) estimating an appropriate noise model for a lightness variation due to an image taking environmental condition under which the input images are taken at the step (a), according to the input images taken at the step (a) and the difference images obtained at the step (b); and (d) detecting changed regions in an entire imaging view field according to the input images taken at the step (a), the difference images obtained at the step (b), and the appropriate noise model estimated at the step (c).

Other features and advantages of the present invention will become apparent from the following description taken in conjunction with the accompanying drawings.

DETAILED DESCRIPTION OF THE PREFERRED EMBODIMENTS

Figure 1:
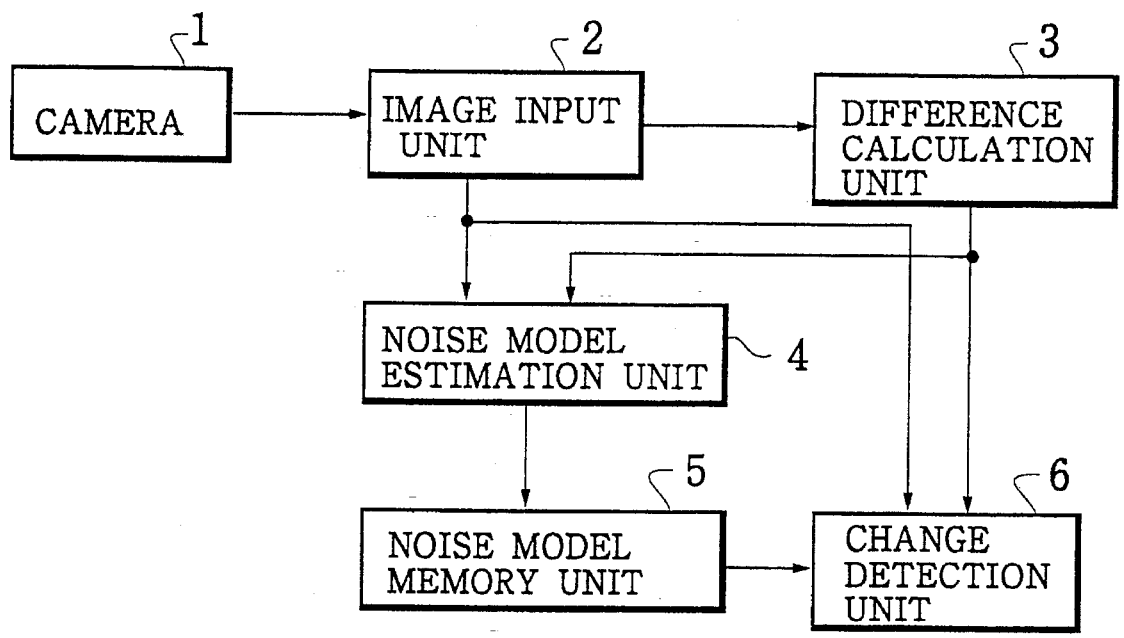
FIG. 1 is a schematic block diagram of one embodiment of an apparatus for detecting changes in dynamic images according to the present invention.

Referring now to FIG. 1, one embodiment of an apparatus for detecting changes in dynamic images according to the present invention will be described in detail.

In this embodiment, the apparatus comprises: a camera 1 for sequentially taking images of a target moving object against a static background; an image input unit 2 for inputting images sequentially taken by the camera 1 as input images at appropriate timings; a difference calculation unit 3 for obtaining difference images for the input images supplied from the image input unit 2; a noise model estimation unit 4 for estimating an appropriate noise model representing a lightness variation of the static image due to the lighting condition according to the input images supplied from the image input unit 2 and the difference images obtained by the difference calculation unit 3; a noise model memory unit for memorizing the noise model estimated by the noise model estimation unit 4; and a change detection unit 6 for detecting changed regions in the input images supplied from the image input unit 2 according to the difference images obtained by the difference calculation unit 3 and the noise model memorized in the noise model memory unit 5.

The image input unit 2 receives the images sequentially taken by the camera 1, and supplies the images to the difference calculation unit 3 and the noise model estimation unit 4 as the input images at appropriate time intervals. Here, the timings for inputting the sequential images taken by the camera 1 into the image input unit 2 may not necessarily be constant. In a case the camera 1 takes the images along an non-interlaced imaging trajectory, the entire imaging view field can be regarded as taken at the same timing, so that the entire imaging view field can be supplied as a single input image. On the other hand, in a case the camera 1 takes the images along an interlaced imaging trajectory, the imaging timings of the odd field image and the even field image cannot be regarded as the same, so that the odd field image and the even field image are separately supplied as separate input images to be treated separately.

The difference calculation unit 3 calculates a difference for each picture element between a newly supplied input image and an immediately previous input image to obtain the difference image, and outputs the obtained difference image as well as an average difference over the entire imaging view field for each difference image.

The noise model estimation unit 4 estimates appropriate noise model parameters by substituting the input image supplied from the image input unit 2 and the difference image and the average difference supplied from the difference calculation unit 3 into a prescribed noise model representing a light variation of the static image due to the lighting conditions.

More specifically, in the noise model estimation unit 4, a ratio of the difference d1 for each picture element having a lightness 1 with respect to the average difference E(di), i.e., di/E(di), is substituted into a first order regression model for the picture element having a lightness i which is expressed by the following equation (1).

$$di/E(di) = \alpha \times i + \beta + d(0, \sigma) \quad (1)$$

where $\alpha$ and $\beta$ are noise model parameters to be determined, and $d(0, \sigma)$ denotes a uniform white noise over the entire imaging view field in a form of the normal distribution with a mean equal to 0 and a variance equal to $\sigma^2$. It is to be noted that the regression model with the order higher than the first order as described above may also be used as the noise model. When the actual lightness variation of the static image fits with this noise model, the difference for each picture element belonging to the static region can be estimated from the average difference E(di) and the lightness i of each picture element. Errors in determining the estimated differences from the actual differences are distributed according to the normal distribution.

In further detail, the operation in this noise model estimation unit 4 in the case of using the first order regression model of the equation (1) is carried out according to the flow chart of FIG. 2, as follows.

First, at the step ST1, image data are sampled from the input image supplied from the image input unit 2 and the difference image supplied from the difference calculation unit 3. Here, the sampling is made at predetermined sampling points which are uniformly distributed over the entire imaging view field at appropriate intervals. In the following, it is assumed that the total number of sampling points in each image is set at m, and the image data are sampled from n successive images. The image data to be sampled includes the difference $di_{pq}$ and the lightness $i_{pq}$ for a q-th sampling point in a p-th image, and the average difference $E(di_p)$ for the p-th image.

Next, at the step ST2, the image data sampled at the step ST1 are substituted into the equation (1) representing the noise model, in order to estimate the appropriate values of the noise model parameters $\alpha$ and $\beta$. Here, in a case of utilizing the statistical estimation based on the least square method, the appropriate values of the noise model parameters $\alpha$ and $\beta$ can be obtained by solving the following equation (2).

$$\begin{pmatrix} n \times m & \sum_{p=1}^{n} \sum_{q=1}^{m} i_{pq} \\ \sum_{p=1}^{n} \sum_{q=1}^{m} i_{pq} & \sum_{p=1}^{n} \sum_{q=1}^{m} i_{pq}^2 \end{pmatrix} \begin{pmatrix} \alpha \\ \beta \end{pmatrix} = \begin{pmatrix} \sum_{p=1}^{n} \sum_{q=1}^{m} di_{pq}/E(di_p) \\ \sum_{p=1}^{n} \sum_{q=1}^{m} i_{pq} di_{pq}/E(di_p) \end{pmatrix} \quad (2)$$

Next, at the step ST3, the distribution of the errors represented by $d(0, \sigma)$ in the equation (1) is estimated by calculating the variance $\sigma^2$ according to the appropriate values of the noise model parameters $\alpha$ and $\beta$ estimated at the step ST2 and the following equation (3).

$$\sigma^2 = \sum_{p=1}^{n} \sum_{q=1}^{m} \{di_{pq} - E(di_p)(\alpha \times i_{pq} + \beta)\}^2/(n \times m) \quad (3)$$

Then, the noise model estimation unit 4 outputs the estimated appropriate values of the noise model parameters $\alpha$ and $\beta$ and the calculated variance $\sigma^2$ to the noise model memory unit 5, such that these quantities are memorized in the noise model memory unit 5 as the representation of the appropriate noise model.

Figure 2:
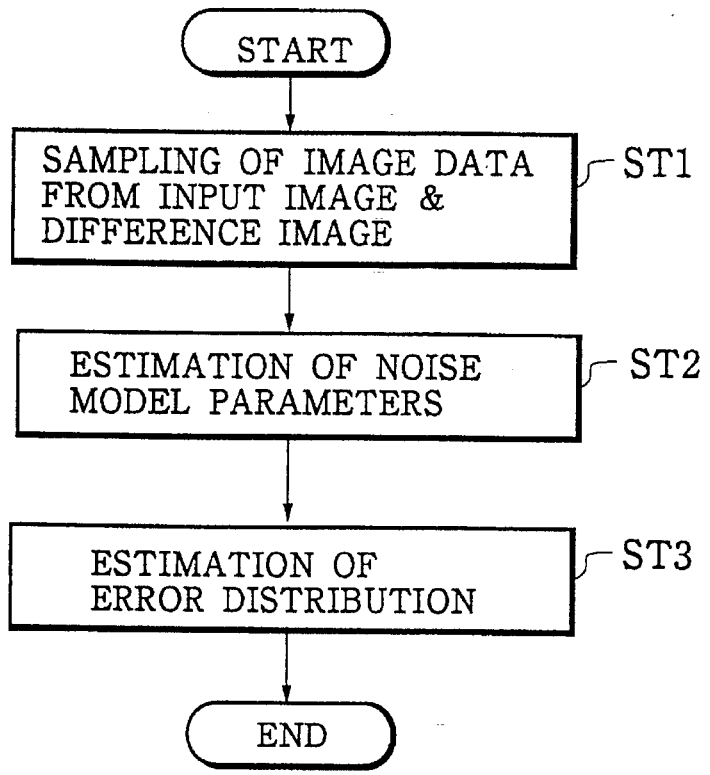
FIG. 2 is a flow chart for an operation of a noise model estimation unit in the apparatus of FIG. 1.

Here, it is noted that, although the noise model used in this noise model estimation unit 4 is given for the lightness variation of the static image, the input images to be used in estimating the noise model parameters according to the flow chart of FIG. 2 may not necessarily be limited to the static images alone. The proper estimation of the noise model parameters can be achieved as long as the changed regions in the input images are sufficiently small for the statistical estimation procedure used. It is also to be noted that the statistical estimation procedure other than that based on the least square method used in the above description may also be used, if desired.

Figure 3:
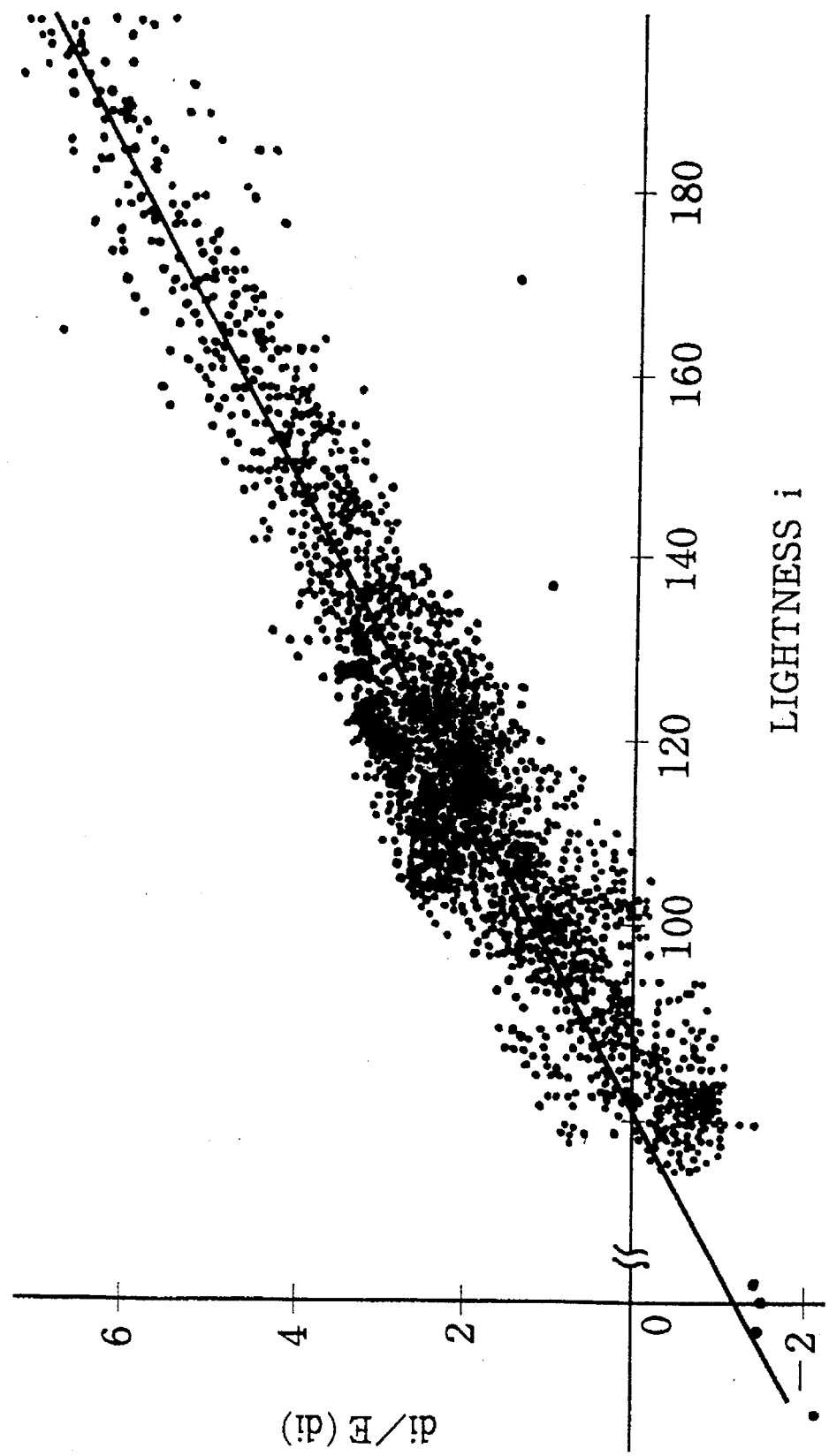
FIG. 3 is a graph indicating an example of a model estimated by the model estimation unit in the apparatus of FIG. 1.

An example of the noise model actually estimated by this noise model estimation unit 4 is shown in FIG. 3, in which a vertical axis represents di/E(di), i.e., the ratio of the difference di for each picture element having a lightness i with respect to the average difference E(di), while a horizontal axis represents the lightness i of each picture element. In FIG. 3, the distribution of the sampled image data ($i_{pq}$, $di_{pq}/E(di_p)$) obtained at the step ST1 in the flow chart of FIG. 2 is plotted along with a straight line indicating the appropriate noise model which can be expressed by substituting the appropriate values of the noise model parameters α and β estimated at the step ST2 in the flow chart of FIG. 2 into the equation (1) described above.

The change detection unit 6 detects the changed regions in which the change of lightness deviates from the noise model according to the noise model memorized in the noise model memory unit 5, i.e., the regions that cannot be regarded as the static regions according to the noise model, on a basis of the input image supplied from the image input unit 2 and the difference images obtained by the difference calculation unit 3.

Figure 4:
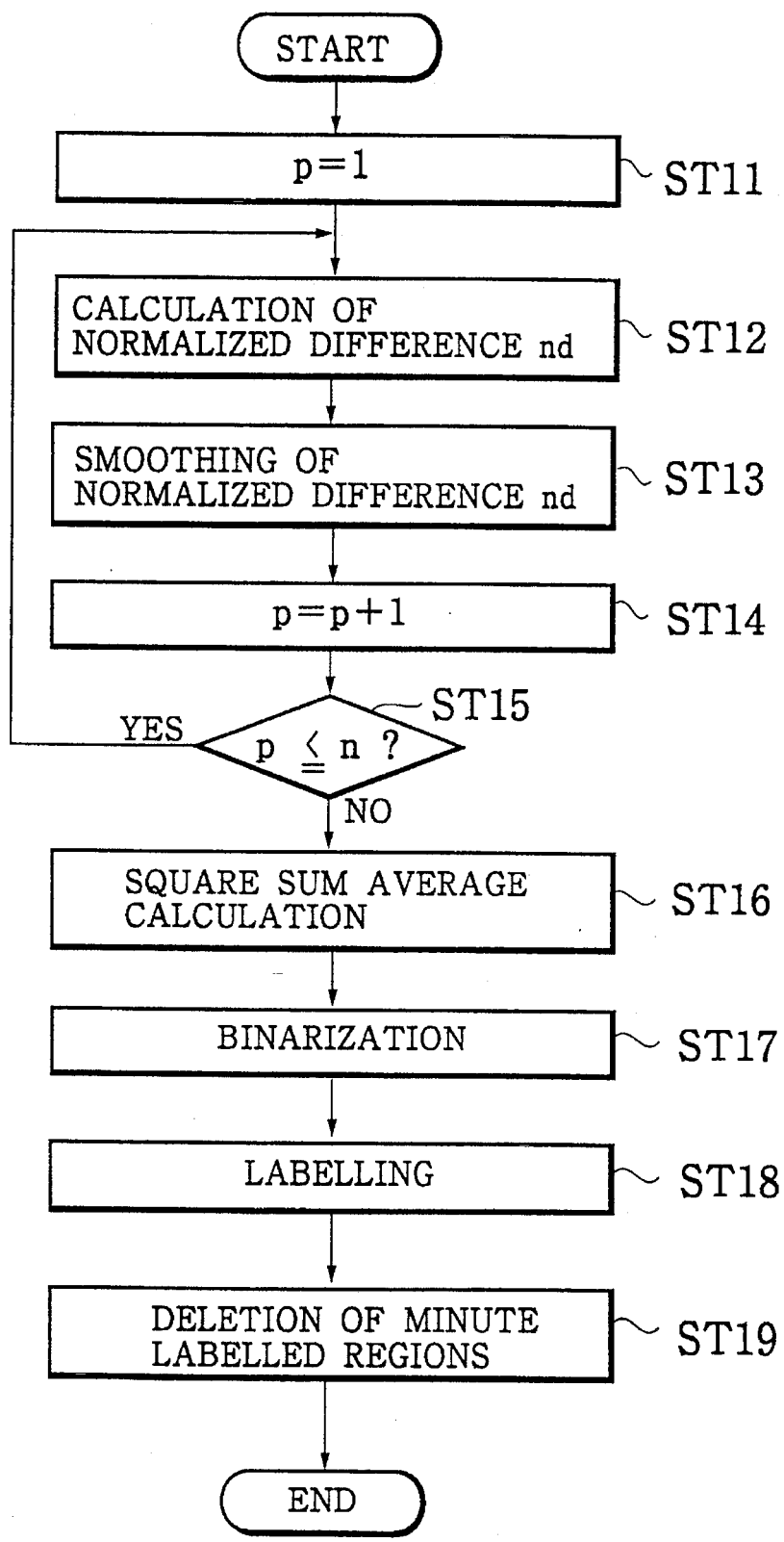
FIG. 4 is a flow chart for an operation of a change detection unit in the apparatus of FIG. 1.

In further detail, the operation in this change detection unit 6 is carried out according to the flow chart of FIG. 4, as follows.

First, at the step ST11, an image counter is initially set to p=1.

Then, at the step ST12, for each picture element at a coordinate (x, y) with the lightness i(x, y), a normalized difference nd(x, y) is calculated by subtracting the estimated difference according to the noise model of the equation (1) from the actual difference di(x, y) in the difference image, according to the following equation (4).

$$nd(x, y) = \{di(x, y) - E(di) \times (\alpha \times i(x, y) + \beta)\} \quad (4)$$

Alternatively, the normalized difference nd(x, y) may be calculated according to the following equation (5) instead of the above equation (4).

$$nd(x, y) = \{di(x, y) - E(di) \times (\alpha \times i(x, y) + \beta)\}/\sigma \quad (5)$$

Here, the normalized differences nd(x, y) calculated by the equation (4) or (5) should be distributed in the normal distribution with the mean equal to 0 and the variance equal to 1, in a case the input image is the static image.

Then, at the step ST13, the normalized difference nd(x, y) for a picture element at a coordinate (x, y) calculated at the step ST12 is smoothed with respect to the normalized differences for the neighboring picture elements, so as to obtain the smoothed normalized difference nd'(x,y) in order to remove the noise factors, according to the following equation (6).

$$nd'(x, y) = (1/16)\{nd(x-1, y-1) + 2 \times nd(x, y-1) + \\ nd(x+1, y-1) + 2 \times nd(x-1, y) + 4 \times nd(x, y) + 2 \times nd(x+1, y) + \\ nd(x-1, y+1) + 2 \times nd(x, y+1) + nd(x+1, y+1)\} \quad (6)$$

Then, at the step ST14, the image counter is increased by one, and the above described steps ST12 to ST14 are repeated for each of the n successive images sampled together at the step ST15.

Next, at the step ST16, an average of a sum of the square of the smoothed normalized difference $nd'_p(x, y)$ for all the n successive images is calculated for each picture element and at the step ST17, the calculated square sum average of the smoothed normalized differences is compared with the predetermined threshold Th in order to obtain the binarized image mv in which the picture elements belonging to the changed regions have the value 1, while the remaining picture elements have the value 0. In other words, the calculation according to the following equation (7) is carried out at the steps ST16 and ST17.

$$mv(x, y) = \begin{cases} 1 & \text{when } \sum_{p=1}^{n} nd'_p(x, y)^2/n > Th \\ 0 & \text{when } \sum_{p=1}^{n} nd'_p(x, y)^2/n < Th \end{cases} \quad (7)$$

Here, the predetermined threshold Th represents a confidence interval for the square sum distribution with a degree of freedom equal to n, which is determined in accordance with a desired confidence level to be realized in this apparatus. Thus, the picture elements having the value 0 in the binarized image mv are those which are regarded as belonging to the static regions according to the noise model of the equation (1) at the desired confidence level, while the picture elements having the value 1 in the binarized image mv are those which are regarded as not belonging to the static regions according to the noise model of the equation (1) at the desired confidence level.

Next, at the step ST18, the labelling operation to attach an identical label to each picture element whose immediately surrounding picture elements have the values 1 in the binarized image mv is carried out. Then, at the step ST19, the area of each region labelled by the identical label is measured, and minute labelled regions for which the measured area is not greater than a prescribed threshold area are deleted from the binarized image mv, so as to neglect the insignificantly small changes in the input image. Then, those labelled regions which remain after the step ST19 can be detected as the changed regions.

As described, according to this embodiment, the detection of the changed regions in the input image is achieved by using the appropriately estimated noise model representing a lightness variation of the static image due to the lighting condition, so that it becomes possible to detect a movement of a target moving object at high precision, without being affected by the variation of the image taking environmental condition such as lighting condition.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An apparatus for detecting a moving object in dynamic images, comprising:

image input means for sequentially taking input images of the moving object against a static background;

difference calculation means for obtaining difference images from successive input images taken by said image input means as picture elements;

noise model estimation means for estimating an appropriate noise model representing a lightness variation due to an image taking environmental condition under which the input images are taken by the image input means, the estimation being made according to the input images taken by the image input means and the difference images obtained by the difference calculation means by estimating values of noise model parameters in a regression model, and specifying a ratio of a difference in lightness at each picture element of each difference image with respect to an average difference in lightness over an entire imaging view field of each difference image as a function of lightness at each picture element in each input image expressed in terms of the noise model parameters;

change determining means for determining changed regions in the entire imaging view field by compensating for the lightness variation by subtracting from the difference images obtained by the difference calculation means an estimated lightness variation based on the noise model estimated by the noise model estimation means; and detecting means for detecting the moving object in the dynamic images according to the changed regions determined by the change determining means.

2. The apparatus of claim 1, wherein the appropriate noise model estimated by the noise model estimation means indicates the light variation due to the image taking environmental condition resulting from a flickering of a lighting system under which the input images are taken by the image input means.

3. The apparatus of claim 1, wherein the change determining means determines the changed regions as those regions which are associated with lightness changes not accounted for by the appropriate noise model estimated by the noise model estimation means as the lightness variation due to the image taking environmental condition.

4. The apparatus of claim 1, wherein the values of the noise model parameters are statistically estimated from a plurality of image data extracted from a plurality of the input images taken by the image input means successively and a plurality of the difference images obtained from said plurality of the input images by the difference calculation means, each image data for each picture element containing the lightness at each picture element of each input image, the difference at each picture element of each difference image, and the average difference of each difference image over the entire imaging view field in each difference image.

5. The apparatus of claim 4, wherein the values of the noise model parameters are statistically estimated by using a least square method.

6. The apparatus of claim 1, wherein the noise model estimation means estimates the values of the noise model parameters by:

calculating a normalized difference for each picture element by subtracting a difference estimation estimated according to the regression model by using the lightness at each picture element of each input image and the average difference over the entire imaging view field in each difference image, from an actual difference at each picture element of each difference image;

calculating a smoothed normalized difference for each picture element by smoothing the normalized difference for each picture element with respect to the normalized differences for neighboring picture elements of said each picture element; and obtaining a binarized image according to a comparison of a square sum average of the smoothed normalized difference for each picture element and a predetermined threshold, to distinguish picture elements associated with lightness changes due to a movement of the moving object from picture elements associated with the static background.

7. The apparatus of claim 6, wherein the predetermined threshold represents a confidence interval for a distribution of the square sum averages of the smoothed normalized differences for all of the picture elements in each difference image at a desired confidence level.

8. The apparatus of claim 6, wherein the noise model estimation means obtains the binarized image by:

comparing the square sum average of the smoothed normalized difference for each picture element with the predetermined threshold;

labelling each picture element which is surrounded by neighboring picture elements having the square sum averages greater than the predetermined threshold;

deleting any minute labelled region formed by the labelled picture elements which has an area not greater than a prescribed area; and detecting each labelled region formed by the labelled picture elements which has an area greater than the prescribed area as the changed regions.

9. A method for detecting a moving object in dynamic images, comprising the steps of:

(a) sequentially taking input images of the moving object against a static background;

(b) obtaining difference images as picture elements from successive input images taken at the step (a);

(c) estimating an appropriate noise model representing a lightness variation due to an image taking environmental condition under which the input images are taken at the step (a), according to the input images taken at the step (a) and the difference images obtained at the step (b) by estimating values of noise model parameters in a regression model, and specifying a ratio of a difference in lightness at each picture element of each difference image with respect to an average difference in lightness over an entire imaging view field of each difference image as a function of lightness at each picture element in each input image expressed in terms of the noise model parameters;

(d) determining changed regions in the entire imaging view field by compensating for the lightness variation by subtracting from the difference images obtained at the step (b) an estimated lightness variation based on the noise model estimated at the step (c); and (e) detecting the moving object in the dynamic images according to the changed regions determined at the step (d).

10. The method of claim 9, wherein the appropriate noise model estimated at step (c) indicates the light variation due to the image taking environmental condition causing a flickering of a lighting system under which the input images are taken at the step (a).

11. The method of claim 9, wherein the changed regions are determined at the step (d) as those regions which are associated with lightness changes not accounted for by the appropriate noise model estimated at the step (c) as the lightness variation due to the image taking environmental condition.

12. The method of claim 9, wherein the values of the noise model parameters are statistically estimated from a plurality of image data extracted from a plurality of the input images taken at the step (a) successively and a plurality of the difference images obtained from said plurality of the input images at the step (b), each image data for each picture element containing the lightness at each picture element of each input image, the difference at each picture element of each difference image, and the average difference of each difference image over the entire imaging view field in each difference image.

13. The method of claim 12, wherein the values of the noise model parameters are statistically estimated by using a least square method.

14. The method of claim 9, wherein the values of the noise model parameters are determined by the steps of:

(c1) calculating a normalized difference for each picture element by subtracting a difference estimation estimated according to the regression model by using the lightness at each picture element of each input image and the average difference over the entire imaging view field in each difference image, from an actual difference at each picture element of each difference image;

(c2) calculating a smoothed normalized difference for each picture element by smoothing the normalized difference for each picture element calculated at the step (c1) with respect to the normalized differences for neighboring picture elements of said each picture element calculated at the step (c1); and (c3) obtaining a binarized image according to a comparison of a square sum average of the smoothed normalized difference for each picture element calculated at the step (c2) with a predetermined threshold, to distingish picture elements associated with lightness changes due to a movement of the moving object from picture elements associated with the static background.

15. The method of claim 14, wherein at the step (c3), the predetermined threshold represents a confidence interval for a distribution of the square sum averages of the smoothed normalized differences for all the picture elements in each difference image at a desired confidence level.

16. The method of claim 14, wherein the step (c3) further comprises the steps of:

(c31) comparing the square sum average of the smoothed normalized difference for each picture element calculated at the step (c2) with the predetermined threshold;

(c32) labelling each picture element which is surrounded by neighboring picture elements which are judged to have square sum averages greater than the predetermined threshold by the comparison at the step (C31);

(c33) deleting any minute labelled region formed by the picture elements labelled at the step (c32) which has an area not greater than a prescribed area; and (c34) detecting each labelled region formed by the picture elements labelled at the step (c32) which has an area greater than the prescribed area as the changed regions.

* * * * *